United States Patent Office 2,939,862
Patented June 7, 1960

2,939,862

LINEAR POLYAMIDES FROM ETHER-TYPE DIAMINES, 1,4-CYCLOHEXANEDICARBOXYLIC ACID AND AN UPGRADING DIAMINE

John R. Caldwell and Russell Gilkey, Kingsport, Tenn., assignors to Eastman Kodak Company, Rochester, N.Y., a corporation of New Jersey No Drawing. Filed Jan. 24, 1957, Ser. No. 635,961

14 Claims. (Cl. 260—47)

This invention relates to highly polymeric linear fiber-forming copolyamides having melting temperatures between about 240° and 320° C. which can be derived by condensing one mole proportion of trans-1,4-cyclohexanedicarboxylic acid with one mole proportion of a mixture containing a major proportion of a bifunctional ether-type diamine and a minor proportion of an upgrading diamine. The ether-type diamine is a compound having one or two ether-type oxy atoms between the amine groups and containing from 6 to 20 carbon atoms. The upgrading diamine is selected from the group consisting of 1,4-cyclohexanebis(methylamine), hexamethylenediamine and p-xylene-α,α'-diamine. This invention also relates to the processes involved, as well as fibers, films, moldings and extruded products which can be produced. The upgraded copolyamides of this invention have excellent dyeing properties, high hydrolytic stability, high impact strength and flexibility at low temperatures, and initial tensile modulus of less than about 25 grams per 100 denier, and other desirable physical and chemical characteristics.

The use of certain ether-type diamines in the preparation of polyamides has been disclosed in the prior art. For example, polyamides derived from terephthalic acid and ether-type diamines have been disclosed. The prior art also discloses polyamides employing 1,4-cyclohexanedicarboxylic acid. Moreover, references have been made in the prior art to the employment of some of the diamines with which the present invention is particularly concerned. 1,4-cyclohexane-bis(methylamine) is disclosed in copending application Ser. No. 617,931, filed Oct. 24, 1956, by Bell et al. describing polyamides prepared from this diamine. However, nothing in the prior art suggests that the particular combination of this invention would produce novel copolyamides which melt at higher temperatures than the homopolyamides and which possess various unexpectedly superior characteristics.

In this specification the term bifunctional ether-type diamine is used in a sense which is intended to cover the use of such diamines as such or in the form of salts which can be made in accordance with techniques well known in the polyamide art. It is not intended to cover trifunctional compounds which would produce crosslinked thermosetting polymers.

Of all the polyamides disclosed in the prior art, that which has met with the greatest commercial success has been nylon 66 which can be derived from the condensation of adipic acid and hexamethylene diamine both of which components contain six carbon atoms. Nylon 66 has a softening temperature of about 220° C. and a melting point of 265° C.

The prior art discloses various copolyamides formed from various components including those used in the preparation of nylon 66. Generally the purpose in preparing such copolyamides is in order to increase dyeability of the polyamide fibers. Much work has been done pertaining to the preparation of block polymers with a view toward improving dyeability and other physical and chemical characteristics. Generally speaking those polyamides which are formed from a simple heating of three polyamide forming components have been found to have low melting points and to be of little practical value since they ordinarily melt below 200° C. To be of general fiber utility a polyamide should melt at a minimum of about 220°–240° C.

The results of employing three components in the formation of copolyamides were studied by Flory who developed a widely accepted rule which states that interpolymers melt well below the homopolymer. Thus, if component A was added during the preparation of polymer B, the melting point would be depressed according to the molecular proportion of A. This rule is discussed at length by Flory in J. Chem. Soc. 72, 2024 (1950); see also J. Chem. Phys., 17, 223 (1949).

The theoretical derivations are given with regard to this rule along with considerable experimental verification. This melting point rule has been widely accepted in polymer science and is frequently called Flory's melting point law. The general validity has been accepted for polyesters and polyamides.

The polyamides of this invention represent an exception to Flory's rule and thereby add an important contribution to the art which has considerable economic value because of the unusually valuable properties of the polyamides of this invention; for example, there is provided extremely high melting polyamides which have unusually low initial tensile modulus whereby fabrics of unusually soft "hand" or feel can be prepared. It is well known in the trade that certain fine wools and special fibers such as vicuna, cashmere, and camel hair command a premium price because they produce products with a durable, soft fleece (see J. Tex. Inst. 36, T107 (1945); also see Fibers, December 1950, page 443). The polyamide fibers made according to the present invention have even lower modulus, and in addition, have much higher tensile strength and superior elastic recovery.

It is thus apparent that the new polyamides of this invention represent an extremely valuable class of textile fibers since they produce an unusual combination of properties hereto not available from this general class of polyamide polymers. In contrast, the polyamides analogous to those in the present invention but using terephthalic acid instead of trans-1,4-cyclohexanedicarboxylic acid possess the expected high initial tensile modulus characteristics and the expected considerably lower melting points as well as other less desirable chemical and physical characteristics.

According to the definitions used by Flory, a copolyamide is named according to the component that is present in the larger amount on the molar basis, that is, a copolyamide employing a single diamine condensed with more than about 50 mole percent of adipic acid and less than 50 mole percent of sebacic acid is considered to be a polyamide of adipic acid and the sebacic acid is considered to be the component which depresses the melting point of adipic acid polyamide. The same principle applies if the polyamide contains a mixture of diamines. Flory states that the melting point depression is very nearly independent of the co-ingredient used. For the purpose of further illustrating Flory's rule, some data is presented in the table below. In this table the co-ingredient is described as 6–10, 6–6, etc. wherein the first figure refers to the number of carbon atoms in a bifunctional straight chain diamine and the second refers to the number of carbon atoms in a bifunctional straight chain dicarboxylic acid. Thus, 6–6 is nylon 66 and 10–6 is polymerized decamethylene adipamide.

COPOLYAMIDES OF DECAMETHYLENE SEBACAMIDE

| Co-Ingredient | Mole Fraction of Decamethylene Sebacamide | Melting Point, °C. |
|---|---|---|
| None | 1.0 | about 209. |
| 10-Terephthalic | 0.9 | 203-204. |
| 6-10 | 0.9 | 203-204. |
| 6-10 | 0.8 | 195-197. |
| 10-6 | 0.8 | 195-197. |
| 10-Isophthalic | 0.8 | 195-197. |
| 6-6 | 0.8 | 195-197. |
| 6-10 | 0.7 | about 188. |
| 6-10 | 0.6 | about 181. |

It can be seen from this table that the melting point of the homopolymer (209° C.) is depressed in a regular manner, depending upon the mole fraction of the co-ingredient present, even though the co-ingredient melts higher than the homopolyamide, for example, 6-6 melts at 264° C. and 10-terephthalic melts above 300° C. and yet, as a co-ingredient, each of these reduces the melting point of the homopolyamide to well below 209° C.

It has been noted that the copolyamide of adipic acid and terephthalic acid with hexamethylenediamine does not show the depression of melting point that would be predicted from Flory's rule. However, those two acids are almost identical in chain length and hence give isomorphous crystals. That is, they both fit into the same crystal lattice and there is no disturbance of the crystal structure. The physical-chemical laws of melting point depression do not apply to isomorphous systems. That hexamethylenediamine produces this result in a terephthalic polyamide is no indication that it would serve as described in this invention; moreover, this invention provides other diamines which have unexpected and even more superior upgrading qualities.

The following table illustrates the effects achieved by this invention on the class of polymers derived from an ether-type diamine employing trans-cyclohexanedicarboxylic acid and an upgrading diamine as described hereinabove.

| Diamines Used as Polyamide Components and Mole Percentages | Melting Point, °C. | Increase in Melting Point, °C. |
|---|---|---|
| (a) 100% 3,3'-(2,2-dimethyltrimethylenedioxy)-bis (propylamine). | about 225-245 | |
| (b) 80% of component as in (a) and 20% 1,4-cyclohexanebis (methylamine). | 300-310 | about 60-80. |
| (c) 75% of component as in (a) and 25% p-xylene-α,α'-diamine. | 285-300 | about 45-70. |
| (d) 100% 3,3'-ethylenedioxybis (propylamine). | about 267-276 | |
| (e) 80% of component as in (d) and 20% hexamethylene-diamine. | 285-300 | about 15-25. |
| (f) 100% 3,3'-tetramethylene-dioxybis (propylamine). | about 247-251 | |
| (g) 75% of component as in (f) and 25% hexamethylenediamine. | 275-285 | about 25-35. |
| (h) 100% 3,3'-cyclohexylene-dimethylenedioxy-bis (propylamine). | about 240-255 | |
| (i) 65% of component as in (h) and 35% hexamethylenediamine. | 270-285 | about 20-40. |

It is to be noted that hexamethylenediamine upgrades the polyamide by increasing the melting point about 15-40 degrees whereas the other upgrading diamines serve to increase the melting point by about 45-80 degrees.

It is an object of this invention to provide a linear highly polymeric fiber-forming copolyamide derived from the condensation of trans-1,4-cyclohexanedicarboxylic acid with a major proportion of an ether-type diamine and a minor proportion of an upgrading diamine.

An additional object of this invention is to provide a process for preparing copolyamides from ether-type diamines having improved melting points, desirably lower tensile moduli of elasticity and other desirable physical and chemical characteristics.

A particularly valuable object of this invention pertains to the upgrading of those ether-type diamines which contain the neopentylene nucleus whereby unusually valuable copolyamides are produced having great resistance to hydrolysis and low initial tensile moduli of elasticity.

A further object of this invention is to provide fibers, films, molded objects, coating compositions and other materials of improved utility.

Additional objects will become apparent elsewhere herein.

According to a principal embodiment of this invention it has been found that a great improvement can be achieved in regard to the linear highly polymeric polyamides of the class consisting of polymers formed by the condensation of a bifunctional aliphatic dicarboxylic compound with a bifunctional ether-type diamine containing from 6 to 20 carbon atoms having from one to two ether-type oxy atoms between the amine groups, which improvement is achieved by employing a trans-1,4-cyclohexanedicarboxylic compound as the aliphatic dicarboxylic compound and having from about 15 to 50 mole percent of the polyamide derived by replacing a portion of the ether-type diamine with an upgrading diamine selected from the group consisting of 1,4-cyclohexane-bis(methylamine), hexamethylenediamine and p-xylene-α,α'-diamine.

According to another embodiment of this invention, there is provided a linear highly polymeric fiber-forming copolyamide derived by heating one mole proportion of a polyamide-forming derivative of trans-1,4-cyclohexane dicarboxylic acid, 1−x mole proportions of a polyamide-forming derivative of a bifunctional ether-type diamine containing from 6 to 20 carbon atoms having from one to two ether-type oxy atoms between the amine groups and x mole proportions of a polyamide forming derivative of a member selected from the group consisting of 1,4-cyclohexane bis(methylamine), hexamethylenediamine and p-xylene-α,α'-diamine, x being from about 0.15 to about 0.5, whereby the copolyamide which is formed melts at above 240° C.

According to a further embodiment of this invention there is provided a highly polymeric linear copolyamide having a softening and melting temperature between about 240° C. and about 320° C., having softening temperature extending over a range of from about 10 to about 20 degrees, having an initial tensile modulus of less than about 25 grams/100 denier, having high hydrolytic stability, and having high impact strength and flexibility at low temperatures, which copolyamide is essentially composed of recurring structural units having the following Formulas A and B:

(A) 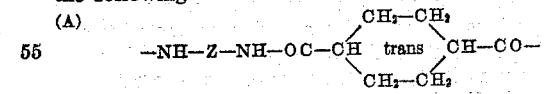

wherein Z represents a member selected from the group consisting of a 1,4-cyclohexanedimethylene radical, a hexamethylene radical and an α,α'-p-xylylene radical, which units are present in an amount of from about 15 to 50% on the average with the remainder of the recurring units of the highly polymeric molecule composed of one of the recurring structural units having the following formula:

(B) 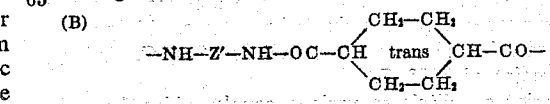

wherein Z' represents a bivalent ether-type radical selected from the group consisting of those having the following formulas:

and

wherein each R represents a polymethylene radical containing from 3 to 6 carbon atoms and R' represents a member selected from the group consisting of the following radicals:

A polymethylene radical containing from 2 to 6 carbon atoms,
A 2,2-dimethylpropylene-1,3-radical,
A 1,4-cyclohexanedimethylene radical,
An α,α'-p-xylylene radical,
A 1,4-cyclohexane radical, and
A 1,4-phenylene radical.

The preparation of the copolyamides of this invention can generally be advantageously accomplished by heating the diamines with the trans-1,4-cyclohexanedicarboxylic compound under any of the well-known conditions adapted to the preparation of polyamides. Most advantageously, salts of the diamines and trans-1,4-cyclohexanedicarboxylic acid can be formed and then heated an an elevated temperature of from about 210° to 320° C. for several hours in a closed vessel under an inert atmosphere. It is advantageous to carry out the first stage of the heating cycle under pressure in order to prevent the escape of volatile reactants, followed by performing the final stage of the polymerization at atmospheric pressure or under a vacuum. The employment of purified salts assures that the diamines and dicarboxylic acid are employed in equivalent amounts. Solvents such as cresol or xylenol can be employed during the reaction. Other techniques can be employed in preparing the copolyamides of this invention. Such techniques are well known in the art and are illustrated in numerous patents or publications. It is obviously not necessary to go into all the variations and ramifications which can be employed in preparing the copolyamides of this invention.

In order to be suitable for the manufacture of films, fibers, sheets and molded objects, a copolyamide should have an inherent viscosity of about 0.4 or higher. Generally, such a viscosity of 0.6 to 0.8 as determined in a solvent composed of 60 parts of phenol and 40 parts of tetrachloroethane is characteristic of a copolyamide of advantageous properties. In some instances where a particularly high intrinsic viscosity is not desired, it may be desirable to add a chain terminator or a stabilizer such as acetic acid or benzoic acid to the reaction mixture in order to keep the viscosity from exceeding the desired range.

The copolyamides of this invention are soluble in volatile solvents such as acetic acid, formic acid, dimethylformamide, butyrolactone, etc.

According to disclosures in the prior art, it would be presumed that the employment of an ether-type diamine together with another diamine in the preparation of polyamides would improve dyeing properties and moisture absorption characteristics but accompanied with a reduction in the melting and softening temperatures of the polyamides so that the products derived would probably have no value as fibers. For example, the polyamides derived from 3,3'-oxybis(propylamine), $$NH_2(CH_2)_3O(CH_2)_3NH_2$$

and aliphatic acids such as adipic or sebacic melt at 196° C. or lower while those made from 3,3'-ethylenedioxy-bis-(propylamine), $H_2N(CH_2)_3O(CH_2)_2O(CH_2)_3NH_2$, melt at 150° C. or lower. Hence, it was very surprising to find that the corresponding polyamides made from trans-1,4-cyclohexanedicarboxylic acid (an aliphatic acid that is isomeric with suberic acid) melt at temperatures which are from about 100 to about 120° C. higher.

It might appear that if ether-type diamines were condensed with terephthalic acid that homopolyamides of improved quality would be produced contrasted to the homopolyamides of aliphatic acids. Although the employment of terephthalic acid results in a higher melting point or softening temperature, other physical and chemical characteristics do not produce sufficiently distinctive properties as to warrant commercial consideration. In contrast, the present invention by the employment of trans-1,4-cyclohexanedicarboxylic acid and the specified upgrading diamines, results in the formation of upgraded polyamides having the outstanding properties described herein.

Hill and Walker in J. Polymer Science, volume 3, pages 6, 19, 21 (1948), describe the influence of aromatic groups on melting points of polyesters, polyamides and polyurethanes. Aromatic groups were found to have the greatest effect on raising the melting point; cycloaliphatic groups were intermediate between the aromatic and the aliphatic. By way of comparison, the polyamide of trans-1,4-cyclohexanedicarboxylic acid and 3,3'-ethylenedioxy-bis-(propylamine) melts at 267° to 276° C. The corresponding polyamide employing terephthalic acid melts in the vicinity of about 230° C. A corresponding copolyamide employing trans-1,4-cyclohexanedicarboxylic acid and an upgrading diamine according to this invention melts in the vicinity of about 285–300° C. as shown in the polyamide (d) of the table above.

Other polyamides wherein terephthalic acid was employed have been prepared, thus in the polyamides tabulated above if trans-1,4-cyclohexanedicarboxylic acid is replaced with terephthalic acid in polyamide (a) the melting point is 163–170° C.; if so replaced in polyamide (f) the melting point is 209–219° C.

Two of the advantages of the copolyamides of this invention worthy of notice are the lower elastic modulus which has been discussed in considerable detail hereinabove and the resistance to acidic hydrolysis. Thus, the copolyamides of the present invention are markedly more resistant to hydrolysis with dilute mineral acids than those analogous polyamides made with terephthalic acid. This factor is important when the products are used in the form of gaskets, packing materials, lining materials for chemical processing equipment, etc.

A third quite valuable property of the copolyamides of this invention is their characteristics at low temperatures. The copolyamides of this invention have remarkable impact strength and flexibility whereby the products of this invention can be used for molding plastics and protective wrapping films at temperatures of from 30 to 40° lower than is practicable with polyamides prepared from components containing no ether groups.

A further valuable characteristic of the copolyamides of this invention is their improved dyeing properties, especially with cellulose acetate dyes and premetallized dyes.

Examples of the ether-type diamines which can be employed in accordance with this invention are obvious from the description set forth hereinabove since the various radicals which can be employed are quite specifically defined. Several examples are given in the working examples set forth hereinbelow. Additional examples include those having the following formulas:

$NH_2-(CH_2)_3-O-(CH_2)_3-NH_2$
$NH_2-(CH_2)_6-O-(CH_2)_6-NH_2$
$NH_2-(CH_2)_6-O-CH_2-C(CH_3)_2-CH_2-O-(CH_2)_6-NH_2$
$NH_2-(CH_2)_3-O-(CH_2)_2-O-(CH_2)_3-NH_2$

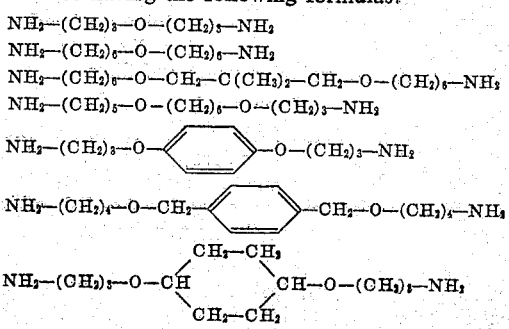

et cetera.

This invention can be further illustrated by the following examples of preferred embodiments although it will be understood that these examples are included merely for purposes of illustration and are not intended to limit the scope of the invention unless otherwise specifically indicated.

Example 1

A mixture of the following salts was placed in a stainless steel autoclave together with 40 ml. of water containing 0.01 gram of acetic acid: (A) 0.4 gram mole of the 3,3'-ethylenedioxy bispropylamine salt of trans-1,4-cyclohexanedicarboxylic acid and (B) 0.1 gram mole of the hexamethylenediamine salt of trans-1,4-cyclohexanedicarboxylic acid. The autoclave was purged with nitrogen and was then further purged of air by heating to 120° C. and blowing off a small amount of steam. It was then closed and heated to 270° C. The pressure was maintained at 30 lbs. per sq. in. by blowing off steam as the temperature was raised. After heating at 270° C. for 30 minutes the autoclave was cooled and the low molecular weight polyamide was transferred to a reaction vessel equipped with a stirrer, a short distillation column, and an inlet for purified nitrogen. The mixture was heated at 285–295° C. with stirring until the excess water was eliminated and a clear melt was obtained. The stirred melt was finally heated for 30 minutes at 310° C. at a pressure of 0.2 mm. A high viscosity polymer with a micro-crystalline melting point of 285–300° C. was obtained. This copolyamide is particularly valuable in the manufacture of fibers having a high softening point, excellent dyeability and other desirable physical and chemical characteristics as described hereinabove.

Example 2

The mixture of 0.08 gram mol of 3,3'-(2,2-dimethyltrimethylenedioxy)-bis-(propyl amine) and 0.02 gram mol of hexamethylenediamine and 0.1 gram mol of trans-1,4-cyclohexanedicarboxylic acid was heated at 220° C. with 20 ml. of mixed meta and para cresols in an atmosphere of nitrogen for two hours. The mixture was then heated two hours longer at 235° C. A viscous almost colorless solution of the polymer in cresol was obtained. The polymer was isolated by pouring the solution into acetone. A high viscosity polymer having a microcrystalline melting point in the vicinity of about 280° C. was obtained which was essentially the same as the copolyamide produced in accordance with Example 1.

The techniques described in the above two examples and elsewhere hereinabove were employed for the preparation of additional copolyamides encompassed within the scope of this invention as follows:

Example 3

A copolyamide made from 0.8 mole of 3,3'-(2,2-dimethyltrimethylenedioxy)-bis-propylamine, 0.2 mole of 1,4-cyclohexane-bis(methylamine), and 1.0 mole of trans-1,4-cyclohexanedicarboxylic acid melted at 300–310°. This is about 60° higher than for the homopolymer.

Example 4

A copolyamide made from 0.6 mole of 3,3'-ethylenedioxy-bis-propylamine, 0.4 mole of hexamethylenediamine, and 1.0 mole of trans-1,4-cyclohexanedicarboxylic acid can be prepared as described in Example 1 and is similarly useful for valuable fibers and films.

Example 5

A copolyamide made from 0.75 mole of 3,3'-(2,2-dimethyltrimethylenedioxy)-bis-(propylamine), 0.25 mole of p-xylene-α,α'-diamine, and 1.00 mole of trans-1,4-cyclohexanedicarboxylic acid melted at 285–300° C. which is about 60° higher than for the homopolymer.

Example 6

A copolyamide made from 0.75 mole of 3,3'-tetramethylenedioxy-bis-propylamine, 0.25 mole of hexamethylenediamine, and 1.00 mole of trans-1,4-cyclohexanedicarboxylic acid melted at 275–285° C. which is about 30° higher than for the homopolymer.

Example 7

A copolyamide made from 0.65 mole of 3,3'-cyclohexylenedimethylenedioxy-bis-(propylamine), 0.35 mole of hexamethylenediamine, and 1.00 mole of trans-1,4-cyclohexanedicarboxylic acid melted at 270–285° C. which is about 30° higher than for the homopolymer.

Although this invention has been described in considerable detail with reference to certain preferred embodiments thereof, it will be understood that variations and modifications can be effected without departing from the spirit and scope of the invention as described hereinabove and as defined in the claims set forth hereinbelow.

Another aspect of the general subject matter disclosed herein relates to the valuable products which are somewhat analogous to those described above but wherein the upgrading diamine is omitted. This distinctly separate subject matter is based upon preparing homopolyamides from the same ether-type diamines defined above condensed with a trans-1,4-cyclohexanedicarboxylic compound using the processes already described whereby high melting valuable homopolyamides are obtained but which do not possess several of the exceptional properties attributed to the copolyamides described above. The following examples will serve to further illustrate this additional inventive subject matter.

Example 8

One hundred grams of 3,3'-ethylenedioxy-bis-propylammonium trans-1,4-cyclohexanedicarboxylate (salt of 3,3'-ethylenedioxy-bis-propylamine and trans-1,4-cyclohexanedicarboxylic acid) and 40 ml. of water containing 0.01 g. acetic acid were placed in a stainless steel autoclave and the autoclave was purged with nitrogen. The autoclave was further purged of air by heating to 120° C. and blowing off a small amount of steam. It was then closed and heated to 270° C. The pressure was maintained at 30 pounds per square inch by bleeding off steam as the temperature was raised. After heating at 270° C. for 30 minutes, the autoclave was cooled and the low-molecular-weight polyamide was transferred to a reaction vessel equipped with a stirrer, a short distillation column, and an inlet for purified nitrogen. The mixture was heated at 270–280° C. with stirring until the excess water was eliminated and a clear melt was obtained. The stirred melt was finally heated for 30 minutes at 280° C. under a vacuum of 0.2 mm. The resulting polymer was light amber in color and had a high melt viscosity. The inherent viscosity of the polymer, as measured in 60 phenol–40 tetrachloroethane, was 0.86. The crystalline melting point, as determined under crossed nicols on the hot stage of a microscope, was 267–276° C.

This polymer could be melt-spun into fibers which could be drawn and heat set easily. The fibers exhibited a high degree of crystallinity and were very strong and elastic. The polymer could also be melt-extruded into film and molded objects.

Example 9

A mixture of 4.36 g. (0.02 mole) of 3,3'-(2,2-dimethyltrimethylenedioxy) bis-propylamine, 3.44 g. (0.02 mole) of trans-1,4-cyclohexanedicarboxylic acid, and 4 ml. of mixed m- and p-cresols were heated at 220° C. in an atmosphere of nitrogen for 2 hours. The mixture was then heated 2 hours longer at 240° C. A viscous, almost colorless solution of the polymer in cresol was obtained. The polymer was isolated by pouring the solution into acetone. The resulting polyamide was white in color and had an inherent viscosity of 0.54. It had a melting point range of 225–245° C. The corresponding terephthalic acid polyamide was made for comparison and was found to melt at 163–170° C. The polyamide in this example is crystalline and can be melt-extruded into strong, elastic fibers and film. It is also valuable in the manufacture of molded objects.

Example 10

Four grams of the salt of trans-1,4-cyclohexanedicarboxylic acid and 3,3'-tetramethylenedioxy-bis-propylamine was heated in an evacuated, sealed tube at 250° C. for 1 hour. A white, opaque cake of low-molecular-weight polyamide was obtained on cooling to room temperature. This prepolymer was transferred to another glass tube and was heated in an atmosphere of nitrogen at 260° C. for 1 hour. Finally, a vacuum of 0.2 mm. was applied at 260° C. for 30 minutes. The resulting polyamide was white in color, had a microcrystalline melting point of 247–251° C., and had an inherent viscosity of 0.93. The corresponding terephthalic polyamide melted at 209–219° C.

This composition is suitable for the manufacture of films and fibers.

Example 11

A polyamide was prepared from trans-1,4-cyclohexanedicarboxylic acid and 3,3'-(cyclohexylenedimethylenedioxy)bis-propylamine. The polymer had a softening point range of 240–255° C. It could be melt-extruded into film and fiber having excellent physical properties.

Example 12

A polyamide was prepared from trans-1,4-cyclohexanedicarboxylic acid and 3,3'-(trans-cyclohexylenedioxy)bis-propylamine. This polymer had a softening point range of 273–291° C. It is valuable in the manufacture of films and fibers.

Example 13

A polyamide was made from trans-1,4-cyclohexanedicarboxylic and 3,3'-oxybispropylamine. It softened in the range of 285–300° C. and gave strong, elastic fibers.

Copolyamides can be prepared by replacing a minor proportion (15–50 mole percent) of the trans-1,4-cyclohexanedicarboxylic acid with a straight chain bifunctional aliphatic dicarboxylic compound containing from 2 to 13 carbon atoms, e.g. oxalic acid, sebacic acid, glutaric acid, succinic acid, azelaic acid, pimelic acid, suberic acid, etc., as can be further illustrated by the following example:

Example 14

A copolyamide was prepared from a ratio of 0.85 mole trans-1,4-cyclohexanedicarboxylic acid, 0.15 mole adipic acid, and 1.0 mole 3,3'-oxybispropylamine. The polymer had a melting point range of 260–274° C. and could be melt-spun into fibers having excellent physical properties.

We claim:

1. A process for preparing a copolyamide comprising heating one mole proportion of a trans-1,4-cyclohexane dicarboxylic acid, 1−x mole proportions of a bifunctional diamine containing from 6 to 20 carbon atoms selected from the group consisting of diamines having the following formulas:

NH₂—R—O—R—NH₂ and

NH₂—R—O—R'—O—R—NH₂ wherein each R represents a polymethylene radical containing from 3 to 6 carbon atoms and R' represents a member selected from the group consisting of the following radicals:

a polymethylene radical containing from 2 to 6 carbon atoms,
a 2,2-dimethylpropylene-1,3 radical,
a 1,4-cyclohexanedimethylene radical,
an α,α'-p-xylylene radical,
a 1,4-cyclohexane radical, and
a 1,4-phenylene radical, and x mole proportions of a member selected from the group consisting of 1,4-cyclohexane bis(methylamine), hexamethylenediamine and p-xylene-α,α'-diamine, said acid and each of said diamines being in a form selected from the group consisting of (a) said acid and each of said diamines and (b) salts of said acid and each of said diamines, x being from about 0.15 to about 0.5, whereby the copolyamide which is formed melts at about 240° C.

2. A highly polymeric linear copolyamide having a softening and melting temperature between about 240° C. and about 320° C., having softening temperature extending over a range of from about 10 to about 20 degrees, having an initial tensile modulus of less than about 25 grams/100 denier, having high hydrolytic stability, and having high impact strength and flexibility at low temperatures, which copolyamide is essentially composed of recurring structural units having the following formulas A and B:

(A)
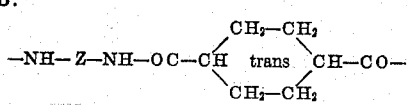

wherein Z represents a member selected from the group consisting of a 1,4-cyclohexanedimethylene radical, a hexamethylene radical and an α,α'-p-xylylene radical, which units are present in an amount of from about 15 to 50% on the average with the remainder of the recurring units of the highly polymeric molecule composed of one of the recurring structural units having the following formula:

(B)
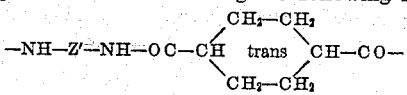

wherein Z' represents a bivalent ether-type radical selected from the group consisting of those having the following formulas:

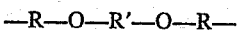

and

—R—O—R'—O—R— wherein each R represents a polymethylene radical containing from 3 to 6 carbon atoms and R' represents a member selected from the group consisting of the following radicals:

a polymethylene radical containing from 2 to 6 carbon atoms,
a 2,2-dimethylpropylene-1,3-radical,
a 1,4-cyclohexanedimethylene radical,
an α,α'-p-xylylene radical,
a 1,4-cyclohexane radical, and
a 1,4-phenylene radical.

3. A copolyamide as defined in claim 2 wherein the recurring structural units are, respectively:

(A)
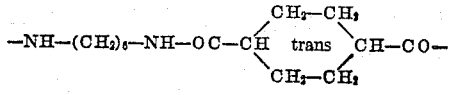

and (B)
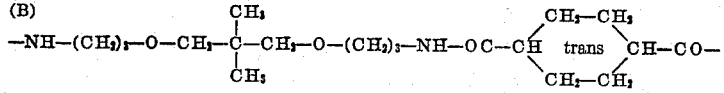

4. A copolyamide as defined in claim 2 wherein the recurring structural units are, respectively:

(A)
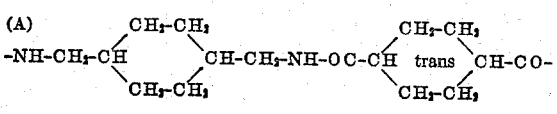

and (B)
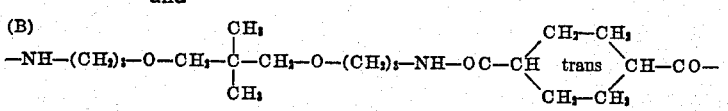

5. A copolyamide as defined in claim 2 wherein the recurring structural units are, respectively:

(A) 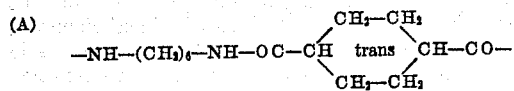

and (B) 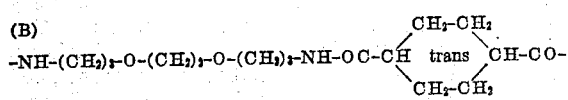

6. A copolyamide as defined in claim 2 wherein the recurring structural units are, respectively:

(A) 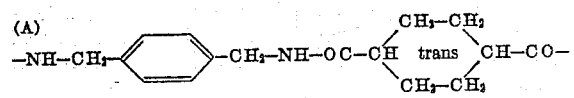

and (B) 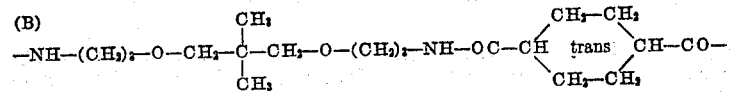

7. A copolyamide as defined in claim 2 wherein the recurring structural units are, respectively:

(A) 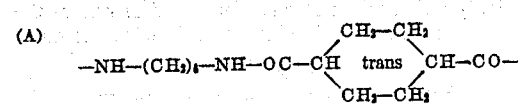

and (B) 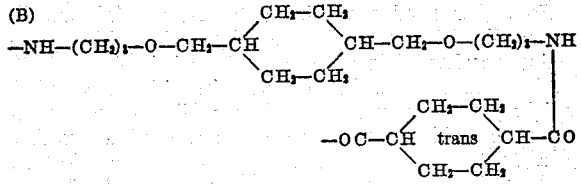

8. A fiber of a copolyamide as defined in claim 2.
9. A film of a copolyamide as defined in claim 2.
10. A fiber of a copolyamide as defined in claim 3.
11. A film of a copolyamide as defined in claim 3.
12. A fiber of a copolyamide as defined in claim 4.
13. A film of a copolyamide as defined in claim 4.
14. A fiber of a copolyamide as defined in claim 6.

References Cited in the file of this patent

UNITED STATES PATENTS

| | | |
|---|---|---|
| 2,268,586 | Gilman | Jan. 6, 1942 |
| 2,359,867 | Martin | Oct. 10, 1944 |
| 2,625,536 | Kirby | Jan. 13, 1953 |

OTHER REFERENCES

Hill et al.: J. Polymer Science, volume 3, 1948, pp. 609, 619–621.

Edgar et al.: J. Polymer Science, volume 8, 1952, pp. 1, 9, 5, 6 and 15–19.

Batzer et al.: Makromol. Chemie, volume 11, 1953, pp. 85–86.

Evans et al.: J. Amer. Chem. Soc., volume 72, 1950, pp. 2018–2028.